US005932867A

United States Patent [19]

Speckhart et al.

[11] Patent Number: 5,932,867

[45] Date of Patent: Aug. 3, 1999

[54] ARTICLE IDENTIFICATION APPARATUS AND METHOD INCLUDING AN IDENTIFICATION ELEMENT WITH LASER THREAD

[75] Inventors: Bernard S. Speckhart; Jose Lopes, both of Short Hills, N.J.

[73] Assignee: White Conveyors, Inc., Kenilworth, N.J.

[21] Appl. No.: 08/865,464

[22] Filed: May 29, 1997

[51] Int. Cl.$^{6}$ .................................................... G06K 19/06

[52] U.S. Cl. .......................... 235/491; 235/385; 235/454; 235/494

[58] Field of Search .................................... 235/491, 385, 235/383, 384, 492, 487, 494, 454

[56] References Cited

U.S. PATENT DOCUMENTS

| | | | |
|---|---|---|---|
| Re. 33,054 | 9/1989 | Markham | 235/385 |
| 1,575,775 | 3/1926 | Lesser | 40/322 |
| 3,478,316 | 11/1969 | Block et al. | 235/385 |
| 3,491,472 | 1/1970 | Walldorf | 40/322 |
| 3,898,754 | 8/1975 | Johansson | 40/322 |
| 4,045,899 | 9/1977 | Richardson | 40/322 |
| 4,198,773 | 4/1980 | Batts et al. | 40/322 |
| 4,550,246 | 10/1985 | Markham | 235/385 |
| 4,679,340 | 7/1987 | Johansson | 40/322 |
| 4,881,836 | 11/1989 | Blanchard | 40/322 |
| 4,887,208 | 12/1989 | Schneider et al. | 235/385 X |
| 5,025,140 | 6/1991 | Varley | 235/385 |
| 5,038,023 | 8/1991 | Saliga | 235/385 |
| 5,299,116 | 3/1994 | Owens et al. | 235/385 X |
| 5,383,111 | 1/1995 | Homma et al. | 235/385 X |

FOREIGN PATENT DOCUMENTS

| | | |
|---|---|---|
| 56-4870 | 1/1981 | Japan . |
| 2080264 | 2/1982 | United Kingdom . |

*Primary Examiner*—Michael G. Lee
*Attorney, Agent, or Firm*—Kenyon & Kenyon

[57] ABSTRACT

An identification device for removable mounting on a hooked member. The identification device includes a small cylindrically shaped member dimensioned to receive a free end of a hooked member. A cloth patch is adhered to an outside surface of the cylinder. The patch includes optically coded laser threads. When the threads are exposed to light, the threads lase, and emit identification signals (signal codes). Each thread's signal code may provide, for example, a unique identification number.

14 Claims, 3 Drawing Sheets

ARTICLE IDENTIFICATION APPARATUS AND METHOD INCLUDING AN IDENTIFICATION ELEMENT WITH LASER THREAD

FIELD OF THE INVENTION

The present invention is directed to a device and method for identifying articles. More particularly, the present invention provides identification for articles supported on hooked members.

BACKGROUND INFORMATION

In many industries, articles supported on hooked members are conveyed on an assembly line. For example, in laundry and dry cleaning facilities, garments supported on hangers are often loaded onto automated conveyors, such as those described in U.S. Pat. No. 5,220,511 to Speckhart et al., expressly incorporated herein by reference. In large laundry and dry cleaning facilities, the garments are loaded onto a sorting conveyor in an unsorted order. There are typically several drop-off stations located at various points along the sorting conveyor. The garments are sorted by moving the sorting conveyor and unloading each garment into a respective drop-off station in a predetermined order. The sorted garments at the drop-off stations are then loaded into trucks for delivery to customers. Exemplary sorting systems are described in U.S. Pat. No. 5,299,134 and U.S. Pat. No. 5,220,511 (both issued to Speckhart et al.), expressly incorporated herein by reference.

In order to sort the garments on the sorting conveyor, it is necessary to first identify (for example, by customer number) each garment in the unsorted sequence of garments. Each garment typically includes a label displaying the necessary identifying information. If the garment has a collar, the label is often located on the interior surface of the collar. If the garment has a waistline, the label is typically located on an exterior surface of the waistline.

In conveying systems, once each hooked member is placed on the conveying line, the hooked member, and the article supported thereon, is typically oriented in a fixed position. The hooked members are often placed in close proximity to neighboring hooked members on the conveying line in order to maximize the usage of space on the conveyor. For example, garment hangers are typically oriented such that the body of each hanger, i.e., the portion of the hanger supporting the garment, is orthogonal to the conveying line. Thus, it is typically not possible to rotate (relative to the conveying line) any one of the hangers, or the article supported thereon, while it is being conveyed. Accordingly, the identification information displayed on a garment's label is usually read by a human operator, and entered into a computer along with information related to the position of the hanger relative to other hangers in the conveying line.

One solution to this problem is proposed in U.S. Pat. No. 5,377,814 issued to Smith et al., expressly incorporated herein by reference. In the system described in the Smith '814 patent, each garment hanger is removably mounted on an individual transport carrier.

Each transport carrier has a unique bar code displayed thereon. The transport carrier bar code is initially correlated with customer information displayed on the garment. The transport carrier bar code is then read as it progresses through the sorting system, and compared with a computer data base of garment information to determine the sorting route. However, this system requires special hardware, in particular, individual transport carriers with bar codes. Accordingly, older conveyor systems cannot be easily retrofitted to implement such a solution.

In another type of system, a transponder mounted in a holder is detachably supported to each hanger supporting a garment. The transponder transmits a unique identification signal (e.g., a unique RF signal) in response to an interrogation signal from a conveyor system. Accordingly, each unique identification signal is initially correlated with customer information displayed on the garment. Each transponder is then interrogated as it progresses through the sorting system, and compared with a computer data base of garment information to determine the sorting route. While such existing conveyor systems may be retrofitted to incorporate these transponders, each transponder is relatively expensive.

SUMMARY OF THE INVENTION

The present invention provides an identification device for removable mounting on a hooked member. In an exemplary embodiment, the identification device includes a small cylindrical device dimensioned to receive a free end of a hooked member. A cloth patch is adhered to an outside surface of the cylinder. The patch includes optically coded laser threads. When the threads are exposed to laser light, the threads lase, and each thread emits an optical signal or signal code. Each thread's signal code may provide, for example, a unique identification number.

In an exemplary system, a garment, having a label with customer identification information, is selected from a number of unsorted garments and is dressed on a hanger.

A uniquely coded identification device is then selected from a plurality of such devices. The identification device is removably mounted on the hanger.

The customer information on the garment label is next read into a computer, and stored in a memory device. The laser threads on the identification device are then scanned, and the unique identification code is read into the computer, and stored in the memory device.

Next, the customer identification information is correlated with the unique identification code from the identification device.

The hanger and corresponding garment are then loaded onto a conveyor. This process is repeated for all garments of concern.

Once all garments are loaded onto the conveyor, they may be easily identified and sorted. In particular, by scanning (anywhere along the conveying line) just the identification device, i.e., without the need for rotating the garment on its corresponding hanger, the identification of the particular garment can be easily determined since the customer identification number is correlated to the unique number coded on the identification device.

DETAILED DESCRIPTION

Figure 1:
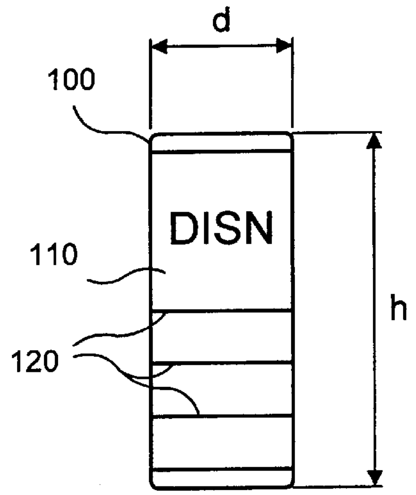
FIG. 1 illustrates an exemplary identification device of the present invention.

Referring now to the drawings, and initially FIG. 1, there is illustrated an exemplary embodiment of an identification device in accordance with the principles of the present invention. A cylindrically shaped collar 100 having a diameter "d" and a height "h" is provided. The collar 100 is dimensioned so that it may be removably mounted on a hooked member, such as, for example, a conventional wire hanger. In the illustrative embodiment, the diameter "d" of the cylinder is approximately 7 mm, and the height “h” is approximately 17 mm, although other dimensions are possible. For example, it may be desirable that the diameter “d” be larger than 7 mm, but less than the space occupied by a hanged garment on a conveyor. The collar 100 may be made of metal or plastic, although other materials may also be used.

While the collar 100 in the exemplary embodiment is illustrated as cylindrically shaped device having an axial bore, other shapes are possible. For example, the collar 100 may be a cube or a rectangular solid having a passage therethrough. The collar 100 may also be a device having an axial channel, e.g., a “un-shaped” or “v-shaped” device.

A cloth patch 110 is adhered to the outer surface of the collar 100. The cloth patch includes one or more laser threads 120 (three are illustrated) which are optically coded. In particular, when the threads 120 are exposed to light, the threads lase, and emit optical signal codes. Each thread’s signal code may provide, for example, a unique identification number or identifier. Such a patch is available from SpectraScience of Providence, RI as model number SS1-0.

The SpectraScience patch includes LaserPaint™ laser threads. The LaserPaint laser threads are formed from a “wavelength tunable” material. That is, the threads are formed by combining laser dye and titania (titanium oxide particles) in a polymer host. When optically excited, each thread emits a precise wavelength, the wavelength being controlled by composition and physical tuning.

By tuning different threads to different wavelengths, many different identification codes may be represented. Assume, for example, three threads are tuned to wavelengths of A, B, and C respectively. These three wavelengths can be combined to form seven different codes: A, B, C, AB, AC, BC, and ABC.

The collar 100 and cloth patch 110 may optionally be covered with a protective coating of clear polyolefin in order to protect the cloth patch 110 from abrasion. Alternatively, a coating of another clear material may be used. The protective coating may be applied, for example, by painting or dipping the collar 100 and cloth patch 110 while the coating is in liquid form, and then allowing the coating to cure or dry to a clear, abrasion resistant coating.

In an alternative embodiment, the laser threads 120 may be directly mounted on the collar 100.

Figure 2:
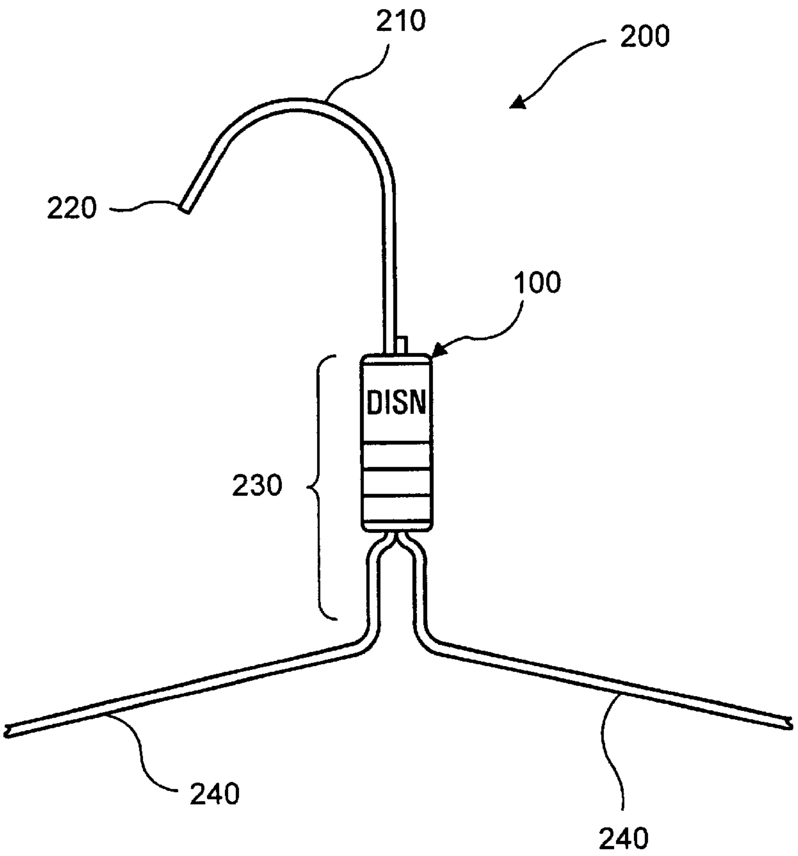
FIG. 2 illustrates the exemplary identification device mounted on a garment hanger.

FIG. 2 illustrates the identification device, i.e., collar 100, removably mounted on a hooked member 200, here, a wire garment hanger, having a hooked portion 210 with a free end 220, a neck 230, and a body 240 for supporting articles such as garments thereon.

The identification device 100 receives the free end 220 of the hooked portion 210 of the hanger 200. The device 100 then slides over the hooked portion 210 and forms a collar around the neck 230 of the hanger 200.

Figure 3:
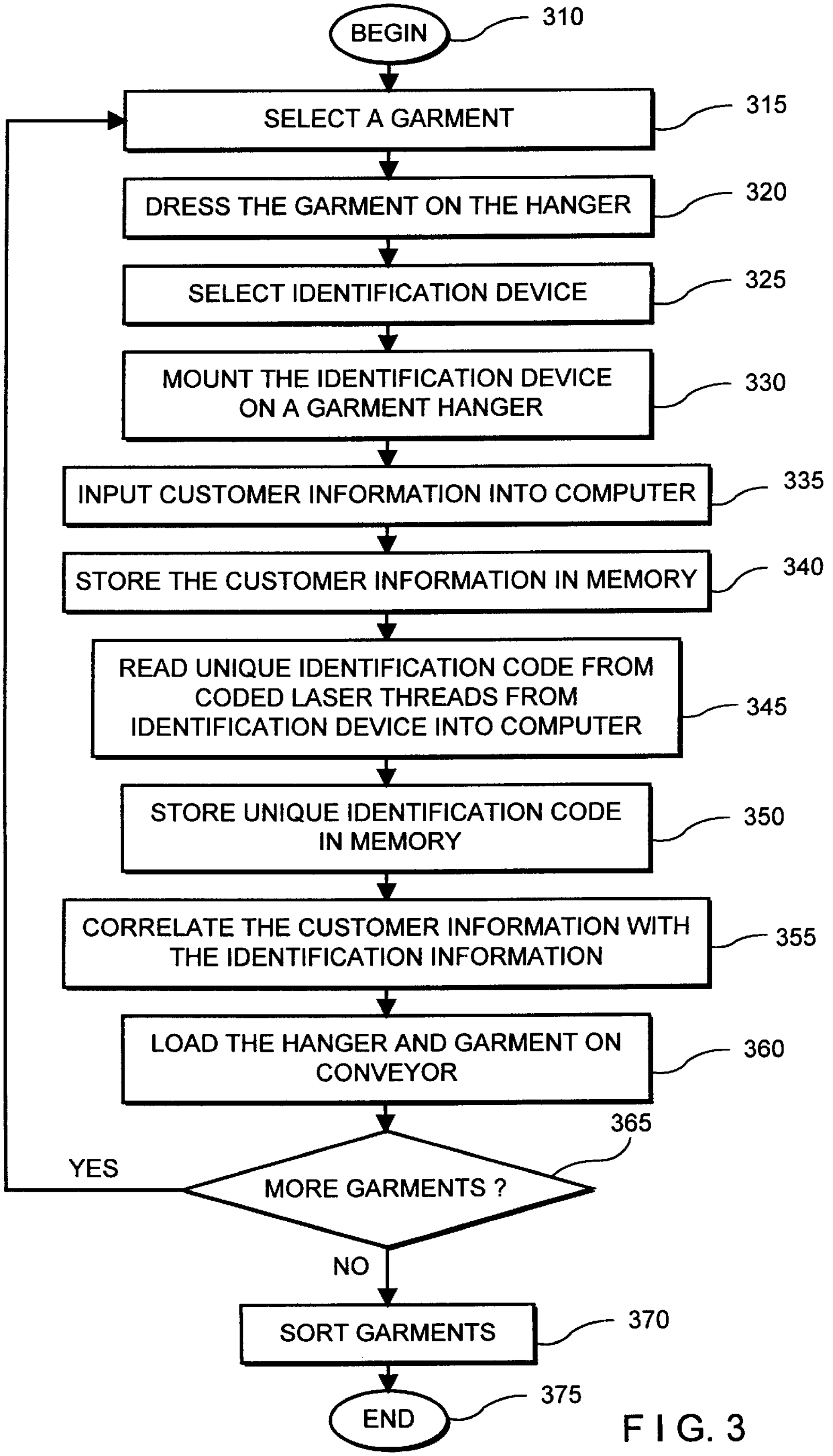
FIG. 3 is a flowchart of an exemplary operation of a sorting system utilizing the identification device of the present invention.

FIG. 3 is a flowchart of the operation of the exemplary sorting system that utilizes the identification device 100. An operator at a workstation selects a garment from a number of unsorted garments (step 315). Each of the garments includes a label including coded customer identification information. The label may be, for example, a cloth label with coded laser threads. Alternatively, the label may include bar codes, any other type of machine readable code, or may simply include human readable (encoded or not encoded) information. Examples of garment labels are described in U.S. Pat. Nos. 5,377,814 and 5,072,822 to Smith et al. and to Smith, respectively (“the Smith patents,” both expressly incorporated herein by reference), and also U.S. Pat. Nos. 5,220,511 and 5,299,134, both to Speckhart et al. (“the Speckhart patents,” both expressly incorporated herein by reference). The operator then dresses the selected garment on a hooked member 200, such as, for example, a hanger (step 320).

Next, the operator selects (manually or automatically) a uniquely coded identification device 100 from a plurality of such devices (step 325). The identification device 100 may be randomly selected, for example, although the devices may alternatively be stored and/or selected in a pre-arranged order.

The operator then removably mounts the identification device 100 on the hooked member 200 in the manner described in connection with FIG. 2 (step 330), for example.

The operator uses the appropriate device to input the customer information from the label on the garment into the computer (step 335). For example, assuming the label includes coded laser threads, the operator uses an appropriate laser scanner (capable of scanning coded laser threads) to scan the customer information into a computer. The computer stores the customer identification into a memory device (step 340).

Next, the operator scans the unique identification code associated with the identification device into the computer with a scanning device capable of illuminating and reading the coded laser threads 120 (step 345). The computer stores the identification code in the memory device (step 350).

The identification code is correlated (by the computer) with the customer information (step 355). The identification code may be correlated with the customer information through the use of a database, for example. In one illustrative embodiment, the customer information and the identification code may be stored in different fields of the same record in a database. Accordingly, the customer information may be indexed or retrieved using the identification code.

The hanger and garment are then loaded onto a conveyor (step 360).

These steps (i.e., steps 315–360) are then repeated until all garments are dressed and loaded onto the conveyor (step 365).

The garments are then eventually sorted (step 365). In one illustrative embodiment, the identification devices mounted on the hangers may be scanned and input into the computer as the hangers and their corresponding garments move along the conveying line. The computer then uses the identification codes to index and retrieve the article information correlated thereto, thereby identifying which garment is on which hanger. The articles may be sorted on a sorting conveyor, for example, as described in the Speckhart patents or the Smith patents (expressly incorporated herein by reference).

As will be understood by those skilled in the art, the process steps described in connection with FIG. 3 may be performed in an order other than that illustrated (and some steps may even be skipped entirely depending on the application). For example, it may be desirable to first scan in the device identification information before scanning in the customer information.

Furthermore, it is contemplated that many, if not all of the steps could be performed either manually or by a machine. For example, the selection and mounting of the identification device on a hanger may be performed by a machine.

Figure 4:
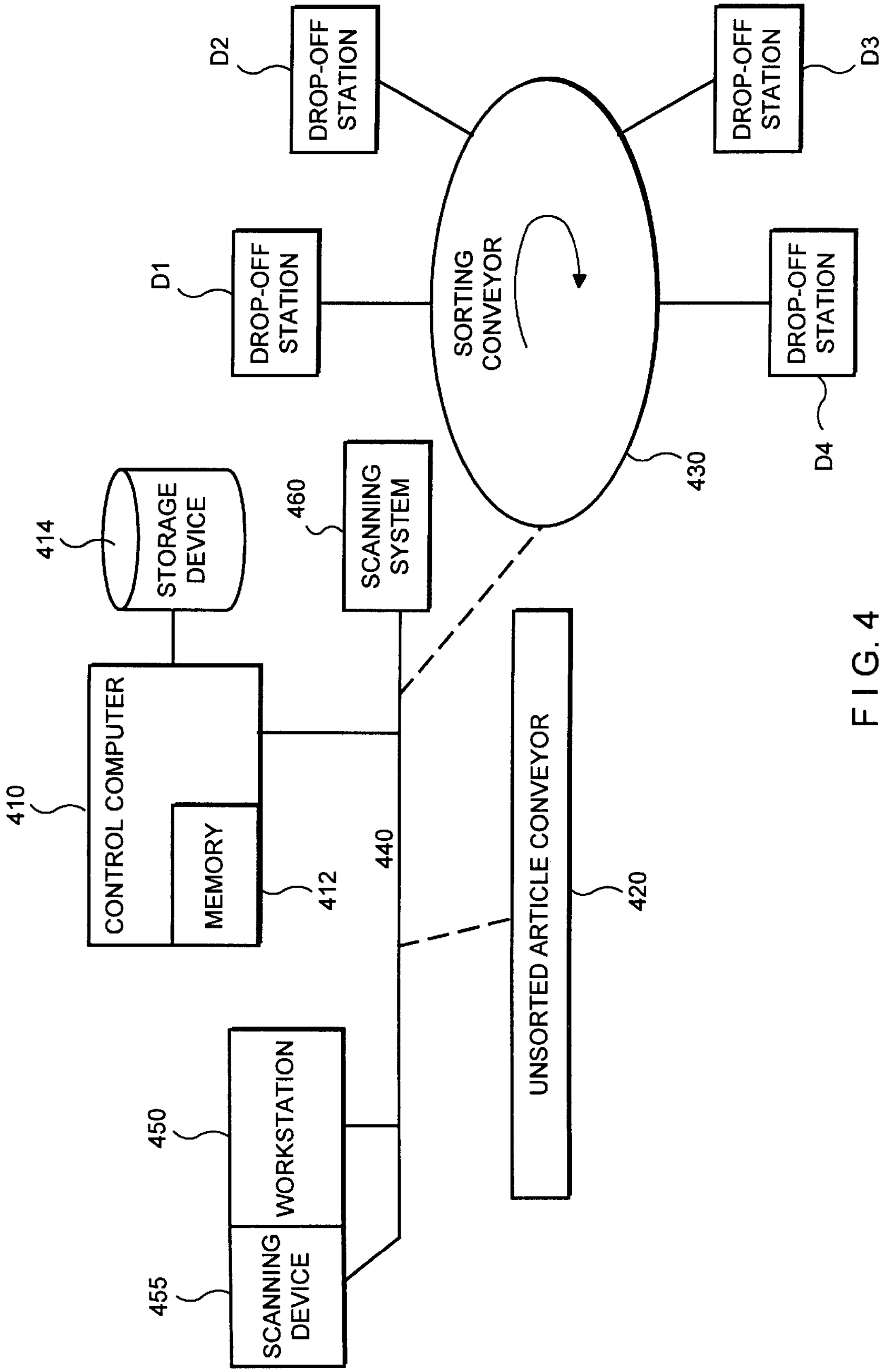
FIG. 4 illustrates an exemplary sorting system.

Referring now to FIG. 4, an exemplary sorting system that performs the procedure of FIG. 3 is illustrated. A control computer 410 having a memory 412 and storage device 414 controls an unsorted article conveyor 320 and a sorting conveyor 430 over a network 440. As illustrated, the sorting conveyer 430 includes a number of drop-off stations, D1–Dn.

The control computer 410 also manages and stores (via network 440) the above described identification information and customer information related to articles being conveyed for purposes of controlling the sorting conveyor 430 to sort the articles.

The identification and customer information is initially received from an operator at a workstation 450 over network 440. The operator workstation 450 includes a scanning device 455 for scanning the identification and customer information either directly into the control computer 410 or indirectly into the control computer 410 through workstation 450.

A scanning system 460 is positioned along the conveying line. The scanning system 460 scans the identification devices mounted on the hangers as the hangers and corresponding garments move along the conveying line.

The information scanned by the scanning system 460 is transmitted to the control computer 410 for processing.

What is claimed is:

1. An identification apparatus for a hooked member, the hooked member having a hooked portion with a free end, a neck, and a body for supporting an article thereon, the identification apparatus comprising:

a cylindrical member having an outer surface and an axial bore, the axial bore for receiving therethrough the free end of the hooked member, thereby allowing the cylindrical member to form a removable collar around the neck of the hooked member;

an identification element including at least one coded laser thread attached to the outer surface of the cylindrical member, wherein when the laser thread is exposed to light, the laser thread emits an optical identification signal.

2. The apparatus of claim 1, wherein the optical identification signal provides unique identification information for identifying the article.

3. The apparatus of claim 1, wherein the identification element further includes a cloth patch.

4. The apparatus of claim 1, further comprising:

a protective coating on the identification element for protecting the identification element from abrasion.

5. An identification device for a hooked member having a hooked portion, a neck, and a body, the body for supporting an article thereon, the identification device comprising:

an identification member having an outer surface, the identification member configured for engaging with the neck of the hooked member;

an identification element including at least one coded laser thread, the identification element being attached to the outer surface of the identification member, wherein when the laser thread is exposed to light, the laser thread emits an identification signal.

6. The apparatus of claim 5, wherein the identification signal provides unique identification information.

7. The apparatus of claim 5, wherein the identification element further includes:

a cloth patch having the at least one laser thread adhered thereto.

8. The apparatus of claim 5, further comprising:

a protective coating on the at least one laser thread protecting the at least one laser thread from abrasion.

9. The apparatus of claim 5, wherein the identification member includes a collar, the collar having an axial channel, the channel dimensioned to receive the neck of the hooked member.

10. The apparatus of claim 5 wherein:

the identification member is cylindrically shaped; and the identification member has an axial bore.

11. The apparatus of claim 10, wherein the axial bore is dimensioned to receive the free end of the hooked member.

12. An identification device comprising:

a hooked member having a hooked portion with a free end, a neck, and a body, the body for supporting an article thereon;

an identification member having an outer surface, the identification member configured for engaging with the neck of the hooked member;

an identification element including at least one coded laser thread, the identification element being attached to the outer surface of the identification element, wherein when the laser thread is exposed to light, the laser thread emits an identification signal.

13. A method for identifying an article comprising the steps of:

(a) providing an article having an article identification positioned thereon;

(b) supporting the article on a body of a hooked member, the hooked member further including a neck;

(c) providing a collar including an identification element, the identification element including at least one laser thread;

(d) mounting the collar on the neck of the hooked member;

(e) reading the article identification;

(f) inputting the article identification into a computer;

(g) storing the article identification in a memory of the computer;

(h) illuminating the at least one laser thread thereby causing the at least one laser thread to emit an optical signal, the optical signal providing a unique identifier;

(i) inputting the unique identifier into the computer;

(j) storing the unique identifier in the memory of the computer;

(k) correlating the article identification with the unique identifier; and (l) loading the hooked member onto a conveyor.

14. The method of claim 13 further comprising the steps of:

(m) repeating steps (a)–(l) for a plurality of articles;

(n) illuminating the at least one laser thread of each collar mounted on each of a plurality of hooked members loaded on the conveyor, causing the at least one laser thread of each collar to emit an optical signal, the optical signal providing a unique identifier;

(o) retrieving each stored article identification correlated with each unique identifier; and (p) sorting the plurality of articles on each hooked member loaded on the conveyor as a function of the retrieved article identifications.

* * * * *